April 10, 1956 W. L. SUTHERLAND 2,741,440
ROLL CENTERING APPARATUS
Filed Feb. 19, 1953 3 Sheets-Sheet 1

Inventor:
William L. Sutherland,
By Fulwider, Mattingly & Babcock.
Attys.

April 10, 1956 W. L. SUTHERLAND 2,741,440
ROLL CENTERING APPARATUS
Filed Feb. 19, 1953 3 Sheets-Sheet 2
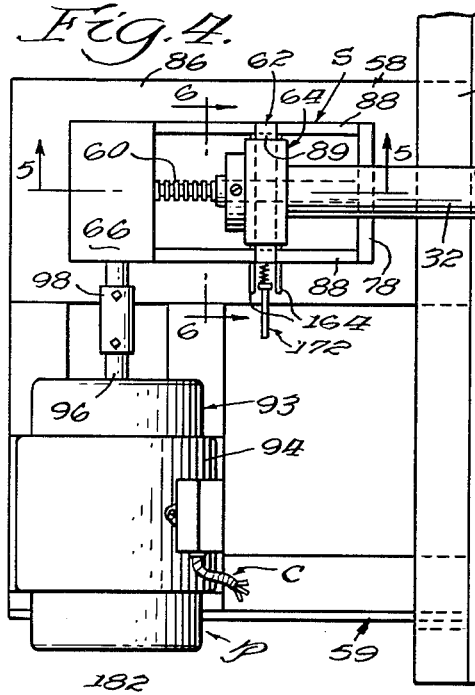
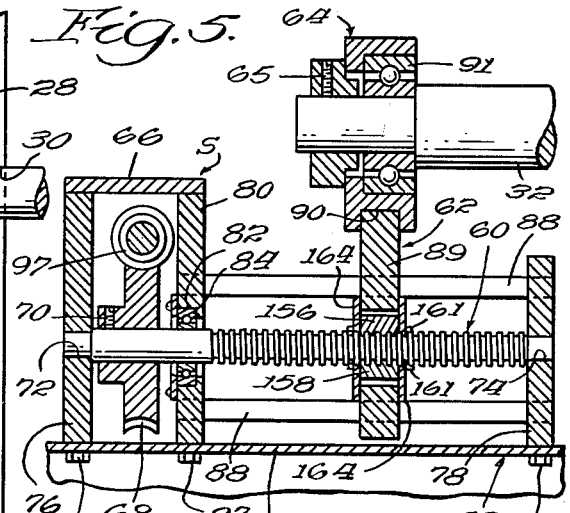
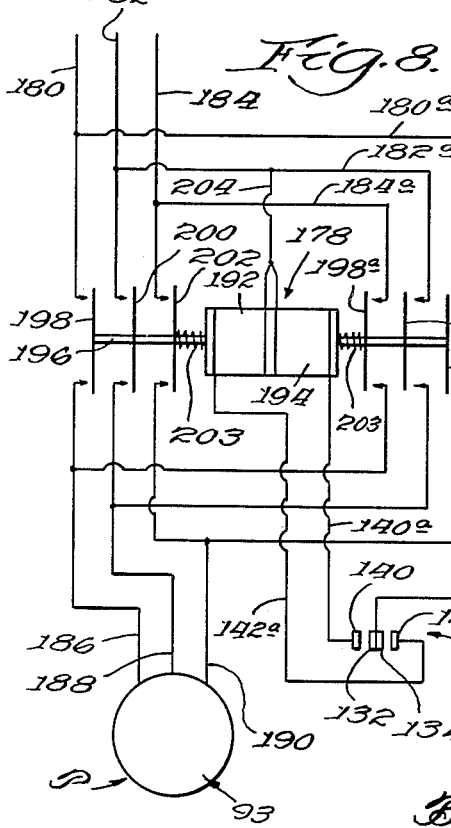
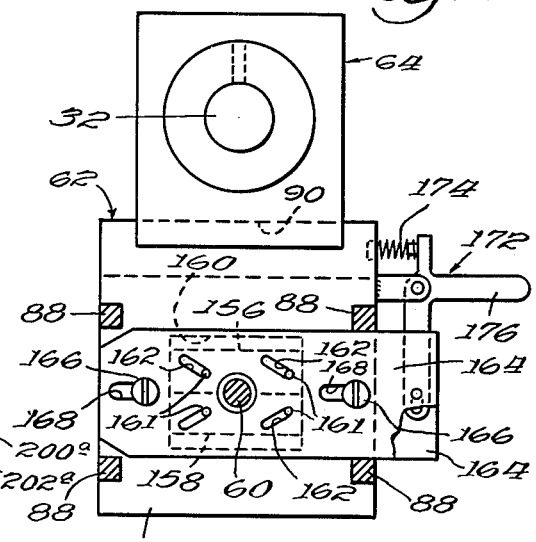
Inventor:
William L. Sutherland
By Fulwider, Mattingly & Babcock
Attys.

April 10, 1956 — W. L. SUTHERLAND — 2,741,440
ROLL CENTERING APPARATUS
Filed Feb. 19, 1953 — 3 Sheets-Sheet 3
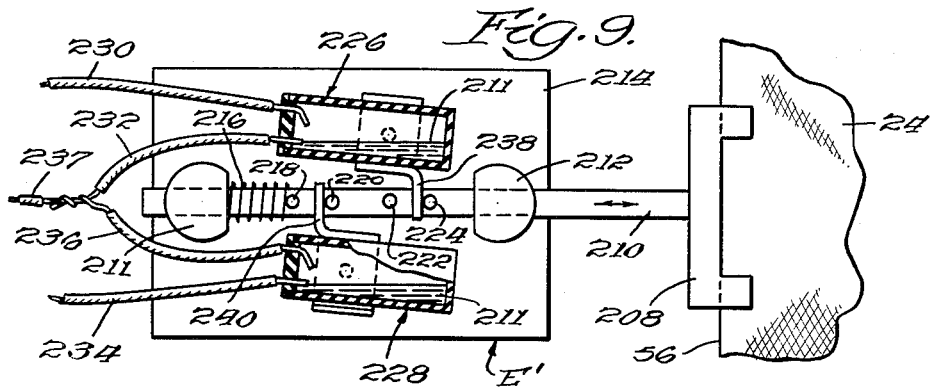
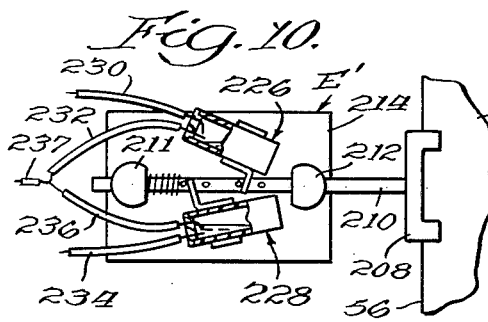
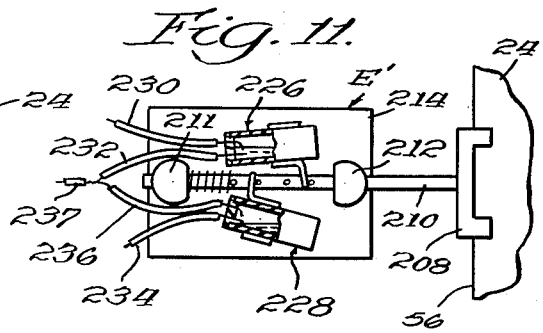
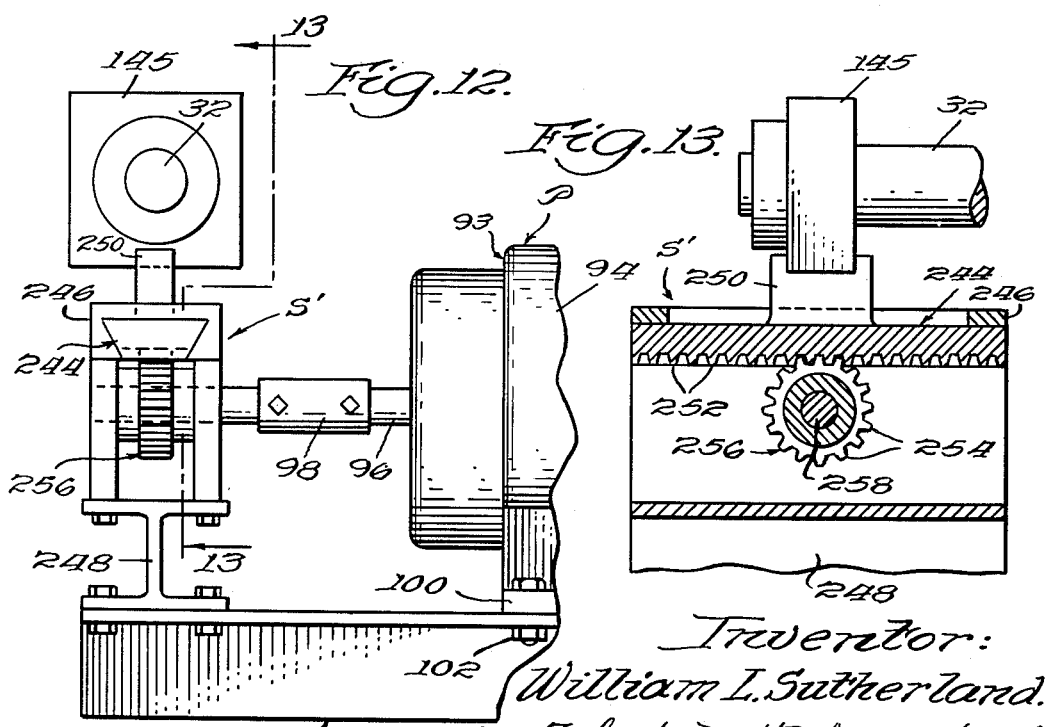
Inventor:
William L. Sutherland
By Fulwider, Mattingly & Babcock
Attys.

United States Patent Office 2,741,440
Patented Apr. 10, 1956

2,741,440

ROLL CENTERING APPARATUS

William L. Sutherland, Whittier, Calif., assignor to Paul Peirce, Los Angeles, Calif.

Application February 19, 1953, Serial No. 337,857

5 Claims. (Cl. 242—76)

The present invention relates generally to centering devices and more particularly to a novel apparatus for automatically maintaining an unwinding roll of sheet material centered relative to the frame of a machine.

Modernly, certain industries, as for example the textile industry, utilize machines mounting a roll of sheet material which is unwound from such roll whereby it may be processed upon a fixed bed member of the machine. In many cases it is essential that as the sheet material moves over such bed member it remain centered relative thereto. If the sheet material is wound upon the roll with its side edges in perfect alignment such centering is not especially difficult. It often happens, however, that in winding the sheet material into a roll, or in transporting the roll thereafter, the side edges thereof are misaligned relative to each other. When this occurs, even though the roll is mounted with its initially-exposed radially outer portion centered relative to the bed member of the machine, at such time as the sheet material is partially unwound the side edges of the then-exposed inner portion thereof may not be centered relative to the bed member.

In order to effect re-centering of the sheet material under these conditions, it has been proposed that the roll be mounted upon a shaft which is manually movable in a transverse direction relative to the bed member of the machine. With this arrangement, at such time as an operator observes that the portion of sheet material passing toward the bed member is off-center relative thereto, he may manually shift the roll-supporting shaft in the necessary direction to effect re-centering of such portion. This arrangement does not prove satisfactory inasmuch as such manual centering is readily susceptible to human error, requires the constant attention of the operator whereby he cannot adequately perform any other duties, and in the common instance where the rolls are heavy, it entails considerable labor upon the part of such operator.

It is a major object of the present invention to provide a novel roll centering apparatus which is completely automatic in operation.

It is another object of the present invention to provide a roll centering apparatus which is sensitive to even slight movement of the sheet material off-center.

A further object of the invention is to provide an automatic roll centering apparatus which is especially fast acting and positive in operation.

It is a further object of the present invention to provide an automatic roll centering apparatus which is simple of design and rugged of construction whereby it has a long and trouble-free service life, requiring only periodic inspection and maintenance.

An additional object of the invention is to provide an automatic roll centering apparatus which may readily be incorporated with existing machines having manual roll centering arrangements, and which may be largely fabricated from existing commercially obtainable parts whereby its cost may be kept comparatively low.

Another object of the present invention is to provide an automatic roll centering apparatus which includes unique means permitting quick and easy initial manual centering of a roll relative to the frame whereon it is being mounted whereafter such centering may be effected automatically.

These and other objects and advantages of the present invention will become apparent from the following detailed description, when taken in conjunction with the appended drawings wherein:

Figure 4 is an enlarged top plan view of a shaft shifting mechanism utilized in said roll centering apparatus;

Figure 5 is a vertical sectional view taken on line 5—5 of Figure 4;

Figure 6 is a vertical sectional view taken on line 6—6 of Figure 4;

Figure 7 is a further enlarged fragmentary view of a detail of said shaft shifting mechanism;

Figure 8 is an electrical wiring diagram which may be used with the roll centering apparatus embodying the present invention;

Figure 9 is an enlarged fragmentary front view of another form of sensing member which may be utilized with a roll centering apparatus embodying the present invention;

Figure 10 is a fragmentary front view similar to Figure 9 but of reduced scale and showing the elements of said sensing member in a different position;

Figure 11 is a view similar to Figure 10, but showing the elements of said sensing member in yet a different position.

Figure 12 is a side view showing another form of shaft shifting mechanism which may be used with a roll centering apparatus embodying the present invention; and, Figure 13 is a vertical sectional view taken on line 13—13 of Figure 12.

The novel roll centering apparatus of the present invention is especially adapted for use with a carpet making machine similar to the one shown in my co-pending application Serial No. 324,617, filed December 8, 1952, now abandoned, and entitled "Method and Apparatus for Making Looped Pile Carpeting and Product Thereof." Accordingly, the roll centering apparatus embodying the present invention is shown and described in conjunction with such machine.

Figure 2:
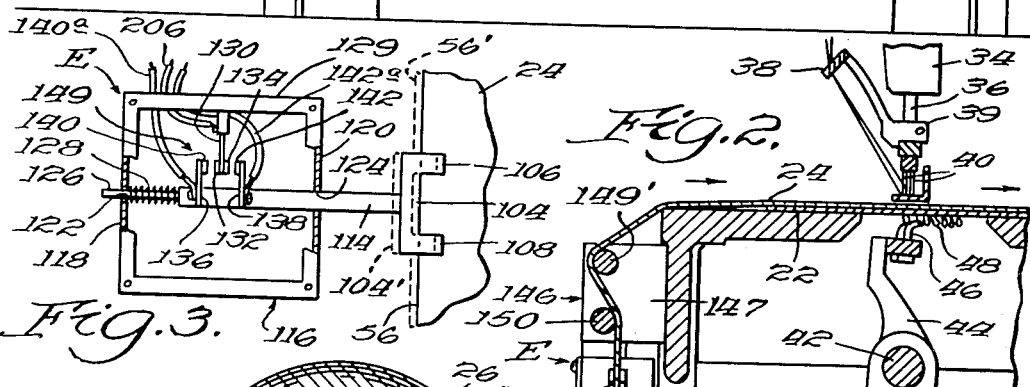
Figure 2 is an enlarged vertical sectional view taken on line 2—2 of Figure 1.

Referring to the drawings, there is shown a carpet making machine, generally designated by the letter M, which includes a frame 20, whereon is mounted a horizontal bed member or needle plate 22, over which a textile sheet material 24 of uniform width is adapted to be longitudinally moved by suitable means (not shown). Referring particularly to Figure 2, it should be noted that the sheet material 24 will move to the right in this figure, as indicated by the directional arrows, and that such movement causes the sheet material to be unwound from a roll 26 of such sheet material. The frame 20 also includes a pair of horizontal support elements 28 formed with aligned semi-circular notches 30 for receiving the opposite ends of a shaft 32 utilized to support the roll 26. The shaft 32 is free to slide transversely relative to the support elements 28, as well as to rotate relative thereto, while the roll 26 is held fixed relative to the shaft, as by a pair of plugs 33. Above the needle plate 22 there is shown disposed a needle head 34, which slidably mounts a needle bar 36 to which is secured part of a yarn jerker 38. An elongate transversely extending needle carrier 39 is rigidly mounted by the lower end of the needle bar 36 and a plurality of needles 40 extend downwardly from the underside of this needle carrier. A horizontal transversely extending shaft 42 is rotatably mounted by the frame 20 at a point spaced below the needle plate 22. This shaft mounts an upstanding looper carrier 44. A plurality of generally hook-shaped loopers 46 are secured to the upper portion of the looper carrier.

The needle 40 and the loopers 46 are adapted to form a plurality of longitudinally extending, transversely spaced rows of loops 48 upon the underside of the sheet material 24 as the latter is moved over the needle plate 22. It is extremely important that such rows extend parallel to the side edges of the sheet material all along the length thereof since if these rows follow a curved path relative to these edges, the appearance of the finished product is entirely unsatisfactory. Hence, it is necessary to maintain the portion of the sheet material passing over the needle plate centered relative thereto. Commonly, the edges of the sheet material in the roll 26 will not lie in the same vertical plane, and hence it is necessary as the sheet material is unwound therefrom to keep shifting the shaft 32, and thus the roll 26, transversely relative to the frame 20 in order to maintain the sheet material centered relative to the edges of the needle plate.

The present invention provides novel apparatus for automatically centering the unwinding sheet relative to the needle plate, which apparatus broadly comprises a shifting mechanism, generally designated by the letter S, adapted to effect transverse movement of the roll 26 relative to the frame 20; power-operated means, generally designated by the letter P, for driving the shifting mechanism S; a sensing member, generally designated by the letter E, engageable with a side edge 56 of the unwound portion of the sheet material 24 between the roll 26 and the needle plate 22; and, connecting means C inter-connecting the sensing member E and the power-operated means P. These members are so arranged that upon transverse movement of the edge 56 relative to the frame in one direction away from the normal position, wherein it is disposed when the sheet material is centered relative to the needle plate, the shifting mechanism S will urge the roll 34 in the opopsite direction until the edge is again disposed in its normal position.

More particularly, the shifting mechanism S preferably comprises a base 58 rigidly secured to one side of a sub-frame 59 of the main frame 20; a screw member 60, rotatably mounted at its opposite ends parallel to the shaft 32 by the base 58; a nut member, generally designated by the numeral 62, threadedly engaged with the screw member 60 in order that it may undergo transverse movement relative to the frame 20 upon rotation of the screw member; and a bearing element 64 interposed between the shaft 32 and the nut member 62 whereby transverse movement of the nut member will effect concurrent transverse movement of the shaft and the sheet material roll 26. The base 58 may include a housing 66 at one of its ends wherein is mounted a gear 68 secured to one end of the screw member 60, as by a set screw 70. The opposite ends of the screw member 60 are shown as being of reduced diameter whereby they may be rotatably secured within aligned bores 72 and 74 formed in end walls 76 and 78, respectively. A side wall 80 of the housing 66 is shown formed with a bore 82 wherein is coaxially mounted a ball bearing 84. The three walls 76, 78 and 80 may be rigidly secured to a horizontal element 86 of the sub-frame 59, as by means of bolts 87. The walls 78 and 80 are shown rigidly interconnected by means of four spacers 88. The nut member 62 will preferably include a vertical main body 89 having a sliding engagement with the four spacers 88. This main body 89 will slide in a transverse direction relative to the spacers 88 upon rotation of the screw member 60. The upper end of the main body 89 is received by a groove 90 formed in the lower end of the bearing element 64. The bearing element is locked to the end of the shaft 32 by means of a keeper 65. A ball bearing 91 is interposed between the shaft 32 and the bearing element whereby the latter may remain fixed rotationally to the shaft while imparting transverse force thereto.

The power operated means P preferably comprises a conventional, commercially available electric brake motor 93 of the reversible type having a cylindrical housing 94 and a shaft 96 extending therefrom. The remote end of this shaft 96 is rigidly coupled to a coaxial worm 97 by means of a coupling 98. The worm 97 extends into the housing 66 wherein it is threadedly engaged with the gear 68. With this arrangement, rotation of the motor shaft 96 is transferred to the screw member 60 by means of worm 97 and gear 68. The motor base 100 is rigidly attached to the sub-frame 59, as by bolt and nut combinations 102.

Figure 3:
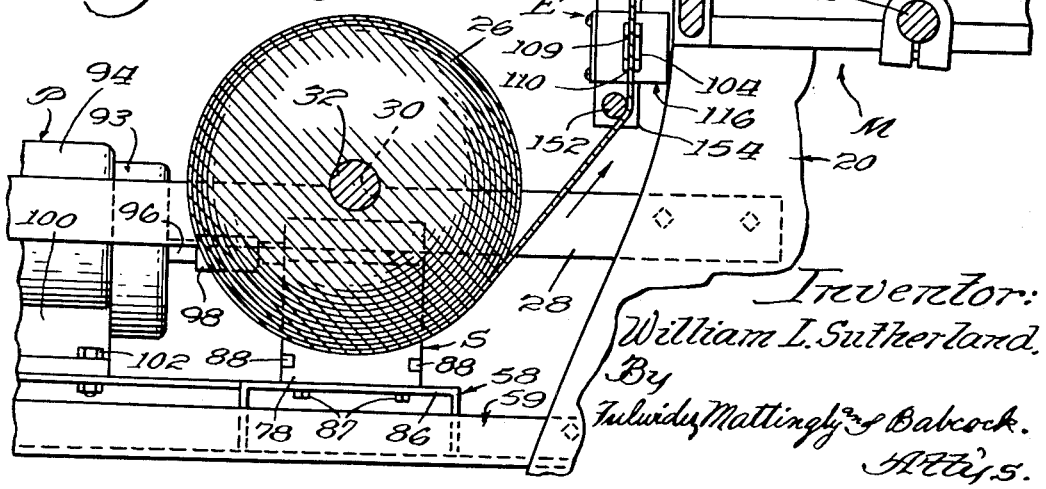
Figure 3 is a further enlarged fragmentary front view of a sensing member which may be utilized in said roll centering apparatus.

The sensing member E preferably includes a generally U-shaped engaging element 104 having legs 106 and 108 formed with notches 109 and 110 for receiving the side edge 56 of the sheet material 24. As clearly shown in Figures 1, 2 and 3, the legs 106 and 108 of the engaging element 104 are vertically aligned and its mid-portion is rigidly attached to one end of a transversely extending mounting arm 114. This mounting arm 114 is shown slidably mounted for transverse movement within a holder 116 rigidly attached to the main frame 20. The mounting arm 114 may be of square or rectangular cross-section whereby it will be keyed against rotation relative to the holder 116. For this purpose, the sides 118 and 120 of the holder 116 may be formed with aligned square or rectangular apertures 122 and 124, respectively. Conveniently, the end of the mounting arm 114 opposite the engaging element 104 includes a reduced portion 126 upon which is coaxially disposed a helical compression spring 128, which serves to constantly bias the arm 114 toward the sheet material edge 56. The top element 129 of the holder 116 is seen to mount a flexible depending finger 130 having electrical contact points 132 and 134 secured to opposite sides of its lower end. The mounting arm 114 likewise mounts a pair of flexible upstanding fingers 136 and 138 having electrical contact points 140 and 142, respectively, secured to their upper ends. These fingers and points function as a double-throw electrical contact switch, generally designated by the numeral 149 which switch operates in a manner to be fully set forth hereinafter.

The connecting means C comprises a plurality of electric current-carrying wires interconnecting the aforedescribed double-throw contact switch 149 and the electric motor 93 in such a manner that engagement of contact points 132 and 140 will cause the motor to rotate in one direction while engagement of contact points 134 and 142 will cause the motor to rotate in the opposite direction.

At this point it should be observed that the unwound portion of the sheet material 24 between the roll 26 and the needle plate 22 is preferably caused to pass through a guide roller assembly, generally designated by the numeral 146, rigidly secured to the front of the frame 120. This assembly 146 may include transversely spaced mounting members 147 and 148 for rotatably supporting three transversely extending, horizontal rollers 149', 150 and 152. The mounting member 147 includes an offset element 154 to which is rigidly attached one side of the previously-described holder 116. Referring now to Figure 2, it will be seen that the forward edges of the lower two rollers 150 and 152 are in vertical alignment with the center of the notches 109 and 110 of the engagement element 104, and that the latter element is disposed intermediately of these two rollers. With this arrangement, the sheet material may be stretched from the roll 26 over the forward edges of the two rollers 150 and 152 rearwardly over the uppermost roller 149', and onto the needle plate 22, whereby the portion of sheet material between the two lower rollers will be in appreciable tension. This tension permits the edge 56 of the sheet material to offer a substantially non-yielding surface against which the engaging element 104 may be pressed.

Figure 1:
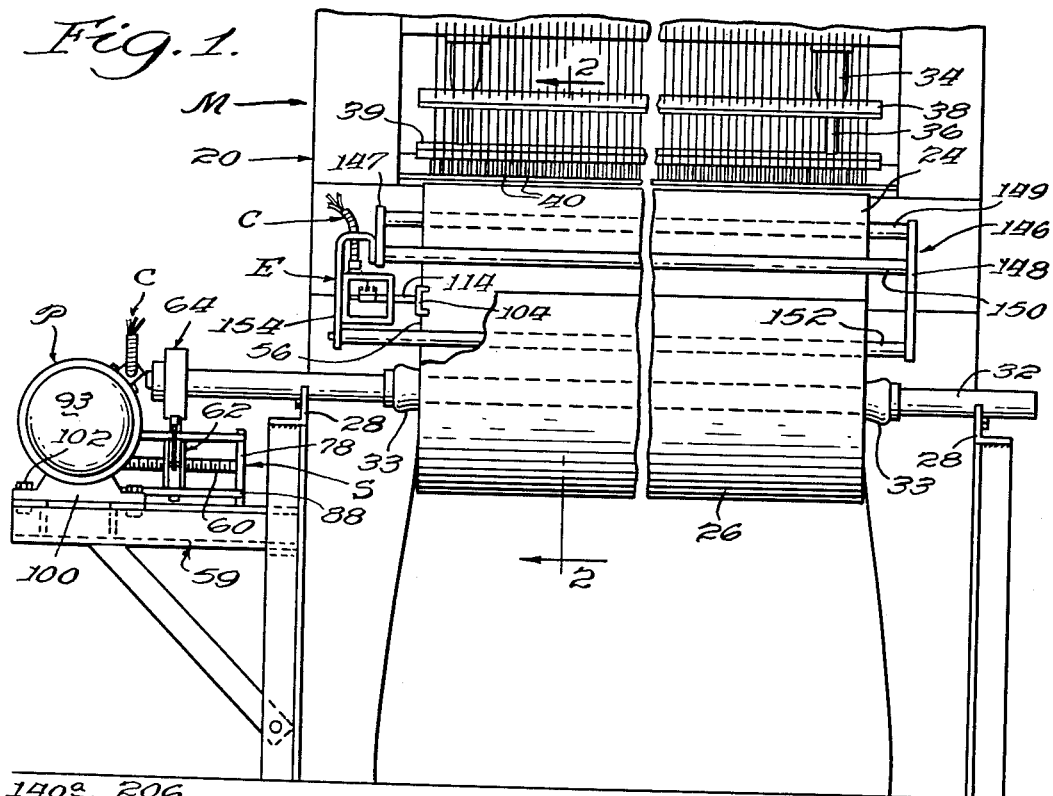
Figure 1 is a front view of a novel roll centering apparatus embodying the present invention.

In operation, the sheet material 24 after having been ararnged in the manner shown in Figures 1 and 2 with its left edge 56 disposed between the bifurcations 109 and 110 of the engagement element 104, will be caused to unwind from its roll 26 to the right over the needle plate 22, as indicated by the directional arrows in Figure 2. Such movement will cause the shaft 32 to be rotated relative to the frame 20. During such rotation the sheet material passing between the rollers 150 and 152 will normally be centered relative to the needle plate and its edge 56 will be disposed in its normal position indicated in solid outline at Figure 3. At this time, the contact points 132 and 134, and 140 and 142 are separated and no current will flow to the electric motor 93. Assuming, however, that the left edge of the unrolling sheet material moves away from its normal position, to the left in Figure 3, until it is disposed in the dotted line position designated 56' in this figure, such movement causes simultaneous movement to the left of the engaging element 104 by virtue of the latter's engagement with the edge 56 whereby such element assumes its dotted line position designated 104' in this figure. This movement of the engagement element causes the contact point 142 to engage the contact point 134 whereby the motor 93 receives current causing it to rotate in the direction necessary to urge the shaft 32 to the right in Figure 1. Such movement of the shaft to the right effects simultaneous transverse movement of the sheet material edge 56 from its dotted line position back to its normal, or solid line, position in Figure 3. Since the mounting arm 114 is biased to the right by the spring 128, the engaging element 104 thereof likewise will return to its solid line position of Figure 3 whereby the contact points 134 and 142 are again separated and the flow of current to the motor cut off. If, rather than moving to the left, the sheet material edge 56 should move away from its normal position to the right in Figure 3, the engaging element 104, and hence the mounting arm 114, will be urged in the same direction under the influence of the spring 128 until the contact points 140 and 132 are engaged. Such engagement causes the motor to rotate in the direction necessary to return the shaft 32 to the left until the edge 56 and the mounting arm 114 again reach their normal positions, at which time the contact points 140 and 132 will be separated and the operation of the motor cease. In this manner, the edge 56 will always be maintained spaced at substantially the same distance from the corresponding edge of the needle plate 22, whereby the sheet material will constantly remain centered relative thereto.

Referring now particularly to Figures 6 and 7, it is desirable to provide means for quickly effecting centering of the shaft 32 between the support elements 28 of the frame 20 when this shaft is first disposed upon the support elements. To this end, the nut member 62 may be of a split construction having an upper screw member-engaging element 156 and a lower screw member-engaging element 158. These elements are slidably mounted for relative vertical movement within a rectangular opening 160 formed in the main body 89 and include rigid pins 161. The pins 161 are slidably disposed within inclined wedging slots 162 formed in a pair of expander plates 164. These expander plates 164 are slidably secured to the sides of the main body 89 of the nut member by means of bolts 166 rigidly mounted by the main body. These bolts 166 have a sliding engagement with horizontally extending slots 168 formed in the expander plate. Referring now to Figure 6, the expander plates 164 are normally biased to the left whereby the upper and lower screw member-engaging elements 156 and 158 are held together with their semi-circular half-bores 170 in engagement with the threads of the screw member 60. The biasing together of these elements may be provided by a control arm 172 pivotally mounted at its upper portion by the main body 89 and having its upper end constantly urged away from such body by means of a helical compression spring 174. With this arrangement, referring to Figure 6, at such time as the shaft 32 is initially placed in the frame notches 30 the screw member-engaging elements 156 and 158 may be caused to undergo vertical separation by raising the handle 176 of the control arm upwardly in a counterclockwise direction; such operation causing the expander plates 164 to move to the right whereby the slots 162 cause the pins 161 to cam these elements apart until they assume the position indicated in Figure 7. The screw member-engaging elements are maintained in their vertically separated relationship while the shaft 32 is manually adjusted transversely relative to the support elements 28. The handle 176 may then be released whereby under the influence of the spring 174 the control arm 172, the expander plates 164 and the screw member-engaging elements 156 and 158 will return to their original positions shown in Figure 6.

Referring now to Figure 8, there is shown a preferred form of electrical wiring diagram contemplated by the present invention. The electrical system embodied in this diagram makes use of an electric motor 93 of the three phase reversible type wherein a reversal of rotation is effected by reversing the polarity of the motor's field. Such reversal of polarity is readily obtained by merely reversing the direction of electric current flow to such field.

With the electrical system of the wiring diagram of Figure 8 the reversal of current direction is effected by means of the aforedescribed double-throw contact switch 149, used in conjunction with a commercially available double solenoid switch, generally designated by the numeral 178. The electric current for driving the motor 93 is shown as entering the upper left-hand of the wiring diagram through conduits 180, 182 and 184; each of these conduits having a branch 180a, 182a and 184a, respectively. The conduits 180, 182 and 184 are adapted to be connected with the motor leads 186, 188 and 190, respectively, whereby the shaft of this motor will rotate in one direction. Alternately, the branches 180a, 182a or 184a may be connected with the motor leads 190, 188 and 186 whereby the shaft of the motor will rotate in the opposite direction. Such interconnection of either the conduits or the branches with the motor leads is effected by means of the double solenoid switch 178. This switch 178 includes a pair of axially spaced solenoids 192 and 194, through which solenoids slidably extends a coaxial plunger rod 196. This rod 196 mounts at its opposite sides a set of circuit-closing bars 198, 200 and 202, and 198a, 200a and 202a. The rod 196 and its circuit closing bars are constantly biased to a central position by compression springs 203. The center of the switch 178 is connected to the conduit 182 by a lead 204, while the opposite ends of the switch are connected to the contact elements 142 and 140 of the double-throw switch 178 by leads 140a and 142a. The contact points 132 and 134 are shown connected to the conduit 180a by a single lead 206.

In operation, none of the contact elements 132, 134, 140 and 142 are normally engaged. However, if contact point 142 is moved into engagement with contact point 134 in the manner described hereinbefore in conjunction with Figure 3, a circuit will be closed between the left side of the solenoid switch 178 and the center thereof whereby the left solenoid 192 is energized and the rod 196 will be urged to the left. Such movement of the rod will cause the closing bars 198, 200 and 202 to close the circuit between the conduits 180, 182, and 184 and the motor leads 186, 188 and 190. The motor will then be caused to rotate in the proper direction to return the roll-supporting shaft 32 and the sheet material edge 56 to their normal positions in the manner described hereinbefore. When the edge 56 has been returned to its normal position, the contact points 134 and 142 will again be separated thereby cutting off the flow of electric current to the motor. Engagement of the other contact points 132 and 140 will effect a similar operation, but with the rod 196 being urged to the right in Figure 8 whereby the branches 180a, 182a and 184a will be connected with the motor leads 190, 188 and 186 respectively. In this manner, the direction of the current flowing to the field of the motor, and hence the polarity of the field thereof, will be reversed. The motor will then operate in the opposite direction so as to return the shaft 32 to the left relative to the frame 20.

Referring now to Figures 9 and 11, there is shown another form of sensing member E' which may be utilized with the roll centering apparatus embodying the present invention. In this form of the invention the engaging element 208 is similar to the engaging element 194 shown in the preceding figures. It should be noted, however, that the mounting arm 210 thereof is slidably mounted between a pair of horizontally spaced supports 211 and 212 rigidly affixed to a holder plate 214. This holder plate 214 is in turn rigidly mounted by the frame of the machine (not shown). A helical coil spring 216 serves to constantly bias the mounting arm 210 to the right toward the left edge 56 of the sheet material 24. This spring 216 is disposed between the left support 211 and a pin 218 secured to the mounting arm 210. A second pin 220 is mounted on the arm 210 adjacent the pin 218. The mounting arm also mounts another pair of pins 222 and 224, which pair is disposed to the right of pins 218 and 220 in these figures. The holder plate 214 pivotally mounts a pair of mercury tube switches 226 and 228 for limited pivotal movement about a horizontal axis. Extending into the switch 226 are the bare ends of a first lead 230 and a second lead 232. Likewise, the bare ends of a pair of leads 234 and 236 extend into the lower switch 228. The leads 232 and 236 are seen to merge into a single lead 237. These various leads may form part of a wiring diagram similar to that shown in Figure 8. With such arrangement, the lead 230 corresponds to the lead 142a; lead 234 corresponds to the lead 140a; and, lead 237 corresponds to lead 206. The upper switch 226 rigidly mounts at its underside a post 238 while the lower switch 228 rigidly mounts on its upper side a similar post 240. It will be seen that the post 238 is disposed between the pair of pins 222 and 224 while the post 240 is similarly disposed between the pair of pins 218 and 220.

In Figure 9 the left edge 56 of the sheet material 24 may be assumed as being disposed in its normal position relative to the frame 20 (not shown). At this time, the bare ends of the leads 230 and 232, and 234 and 236 disposed within the two switches 226 and 228 will be separated and no current will flow therebetween. Hence, both switches are in an "off" position. If, however, the edge 56, and hence the engaging element 208 and the mounting arm 210, are moved to the left away from their normal position in this figure to their position of Figure 10, the pins 220 and 224 will cam the posts 240 and 238 so as to tilt the switches until the weight of the mercury 211 contained therewithin causes them to assume the position indicated in Figure 10; i. e., as the switches are tilted the mercury within the upper switch 226 causes the right end of such switch to pivot downwardly, while the mercury within the lower switch 228 causes the left end thereof to pivot downwardly. The mercury within the latter switch 228 will then cover the bare ends of the leads 234 and 236, and since mercury is conductive, electric current may flow between these bare ends. The switch 228 will then be in "on" position. If these leads 234 and 236 are arranged in a wiring diagram similar to that of Figure 8 as set forth hereinbefore, it will be apparent that connecting the bare ends thereof will correspond to effecting the engagement of the contact points 140 and 132 of the aforedescribed double throw contact switch 149; i. e., the motor 93 will be caused to operate in the direction necessary to return the shaft 32, and hence the side edge 56 of the sheet material, to the right to their normal position.

If on the other hand, the sheet material edge 56 initially moves away from its normal position to the right to the position 56" shown in Figure 11, the sensing element 208 and the mounting arm 210 will likewise be moved in this direction. Upon such occurrence, the mercury switches 226 and 228 will assume the positions of Figure 11 by virtue of the abutment of the pins 218 and 222 with the posts 240 and 238, respectively. With the mercury switches disposed in this position a circuit connecting the bare ends of the leads 230 and 232 is completed by the mercury within the upper switch 226 as it flows to the left side thereof. The switch 226 would then be in "on" position. At the same time the mercury within the lower switch 228 will flow to the right side thereof so as to break the connection between the bare ends of the leads 236 and 234. The direction of rotation of the motor will then be reversed so as to effect movement of the sheet material 24 to the left.

In Figures 12 and 13 there is shown another form of shifting mechanism S' which may be utilized with the roll centering apparatus embodying the present invention, which mechanism utilizes a rack and pinion type of construction. The rack member 244 is seen to be slidably mounted within a base 246 rigidly connected to the subframe 59, as by means of an I-beam 248. The rack member includes an upstanding lug 250 adapted to rigidly mount a bearing element 145 similar to that shown in Figures 5 and 6. The teeth 252 of the rack are shown engaged with the teeth 254 of a pinion 256 which latter member is keyed to a short shaft 258. This latter shaft is coupled to the shaft 96 of the motor 93 by means of a coupling 98. In operation, rotation of the electric motor 93 will effect concurrent rotation of the shaft 258 and the pinion 256, which rotation will effect transverse sliding movement of the rack 244 relative to the base 246. Since the rack is connected to the end of the shaft 32 by means of the bearing element 145, the shaft and the roll of sheet material carried thereby will likewise be moved axially or transversely relative to the frame of the machine.

It should be particularly noted that either of the sensing members E or E' may be utilized with either of the shifting mechanisms S or S'. Additionally, although the roll centering apparatus of the present invention has been shown and described herein as utilized for effecting the centering of sheet material being unwound from a roll, it will be apparent that it may also be used with but minor changes to center sheet material being wound into a roll. Likewise, it should be observed that although the specific embodiments herein shown and described are fully capable of providing the advantages and achieving the objects previously mentioned, such embodiments are merely illustrative and various modifications and changes may be made thereto without departing from the spirit of the invention or the scope of the appended claims.

I claim:

1. Centering apparatus for use with a partially unwound roll of sheet material, a shaft coaxially mounting said roll, a frame, and means on said frame supporting said shaft for axial movement, comprising: a pair of guide rollers mounted by said frame parallel to said shaft adapted to guide the sheet material as it is unwound from said roll; holder means affixed to said frame; a mounting arm mounted by said holder means intermediately of said guide rollers whereby it may undergo transverse movement relative to a side edge of the portion of sheet material disposed between said rollers; spring means biasing said arm toward said edge; an engaging element secured to said arm and engageable with said edge whereby said arm will be moved transversely relative to said frame concurrently with transverse movement of said edge relative thereto; electric switch means operatively connected to said arm so as to be actuated upon transverse movement of said edge away from its normal position relative to said frame; a screw member rotatably mounted by said frame parallel to said shaft; horizontal spacers on said frame parallel with said shaft; a vertical nut member having a sliding engagement with said spacers and formed with a central opening; a pair of screw member-engaging elements disposed within said opening; pins mounted by said elements; an expander plate slidably carried by said nut member and formed with wedging slots wherein are disposed said pins; a control arm interposed between said nut member and said expander plate for effecting relative movement therebetween whereby said wedging slots and pins will cam said screw member-engaging elements apart; spring means normally biasing said screw member-engaging elements together in contact with the threads of said screw member whereby upon rotation of said screw member said nut member will move transversely relative to said frame; means connecting said nut member to said shaft in order that the transverse movement of said nut member may effect concurrent axial movement of said shaft; a normally inoperative reversible electric motor for driving said screw member; and, means interconnecting said switch means and said motor whereby upon transverse movement of said edge in one direction away from its normal position said motor will operate to urge said shaft in the opposite direction until said edge is again disposed in said normal position and upon transverse movement of said edge in the opposite direction said motor will operate in reverse so as to urge said shaft in said one direction until said edge is disposed in said normal position.

2. Centering apparatus for use with a partially unwound roll of sheet material, a shaft coaxially mounting said roll, a frame, and means on said frame supporting said shaft for axial movement, comprising: a holder plate affixed to said frame; a pair of horizontally spaced support elements rigidly secured to said plate and formed with aligned apertures; a horizontal mounting arm slidably carried within said apertures parallel to said shaft whereby it may undergo transverse movement relative to a side edge of the partially unwound portion of said sheet material; two horizontally spaced pairs of pins mounted upon the portion of said arm intermediate of said support elements; a helical compression spring encircling the portion of said arm between the support element remote from said edge and the pin remote therefrom whereby said arm will be biased toward said edge; a pair of mercury tube switches pivotally secured to said plate, said tubes normally being in an "off" position; a post mounted by each of said tubes and having their free ends disposed between one of said pairs of pins whereby upon transverse movement of said arm in one direction one of said switches will be pivoted to an "on" position and upon transverse movement of said arm in the opposite direction the first switch will be pivoted to an "off" position and the second will be pivoted to an "on" position; an engaging element secured to said arm and engageable with said edge whereby said arm will be moved transversely relative to said frame concurrently with transverse movement of said edge relative thereto; a shaft shifting mechanism for effecting axial movement of said shaft relative to said frame; power-operated means for driving said shaft shifting mechanism; and, means interconnecting said switch means and said power-operated means whereby upon transverse movement of said edge in one direction away from its normal position said power-operated means will operate to urge said shaft in the opposite direction until said edge is again disposed in said normal position and upon transverse movement of said edge in the opposite direction said power-operated means will operate in reverse so as to urge said shaft in said one direction until said edge is disposed in said normal position.

3. Centering apparatus for use with a partially unwound roll of sheet material, a shaft coaxially mounting said roll, a frame, and means on said frame supporting said shaft for axial movement, comprising: a guide roller assembly mounted by said frame that includes three aligned guide rollers rotatably mounted by said frame parallel to said shaft whereby said sheet material may be stretched over one edge of the center and one of the outer rollers and from said one edge of the center roller over the opposite edge of the outer roller; holder means affixed to said frame; a mounting arm mounted by said holder means in alignment with and intermediately of said one edge of the center roller and said one of the outer rollers whereby it may undergo transverse movement relative to a side edge of the portion of sheet material disposed between the last-mentioned rollers; spring means biasing said arm toward said side edge of the sheet material; a generally U-shaped engaging element on said mounting arm and having a pair of parallel legs that are each formed with aligned notches for receiving said side edge of the sheet material whereby said arm will be moved transversely relative to said frame concurrently with transverse movement of said side edge relative thereto; electric switch means operatively connected to said arm so as to be actuated upon transverse movement of said side edge away from its normal position relative to said frame; a shaft shifting mechanism for effecting axial movement of said shaft relative to said frame; power-operated means for driving said shaft shifting mechanism; and, means interconnecting said electric switch means and said power-operated means whereby upon transverse movement of said side edge away from its normal position said shaft shifting mechanism will urge said shaft in the opposite direction until said side edge is again disposed in said normal position.

4. Centering apparatus for use with a partially unwound roll of sheet material, a shaft coaxially mounting said roll, a frame, and means on said frame supporting said shaft for axial movement, comprising: a guide roller assembly mounted by said frame that includes three aligned guide rollers rotatably mounted by said frame parallel to said shaft whereby said sheet material may be stretched over one edge of the center and one of the outer rollers and from said one edge of the center roller over the opposite edge of the outer roller; holder means affixed to said frame; a mounting arm mounted by said holder means in alignment with and intermediately of said one edge of the center roller and said one of the outer rollers whereby it may undergo transverse movement relative to a side edge of the portion of sheet material disposed between the last-mentioned rollers; spring means biasing said arm toward said side edge of the sheet material; a generally U-shaped engaging element on said mounting arm and having a pair of parallel legs that are each formed with aligned notches for receiving said side edge of the sheet material whereby said arm will be moved transversely relative to said frame concurrently with transverse movement of said side edge relative thereto; electric switch means operatively connected to said mounting arm so as to be actuated upon transverse movement of said side edge away from its normal position relative to said frame; a rack member slidably mounted by said frame for transverse movement relative thereto parallel to the longitudinal axis of said shaft; means connecting said rack to said shaft in order that the transverse movement thereof may effect concurrent movement of said shaft; a pinion member rotatably mounted by said frame and having its teeth meshed with those of said rack; power operated means for rotating said pinion; and means interconnecting said electric switch means and said power operated means whereby upon transverse movement of said edge in either direction away from its normal position relative to said frame, said shaft will be urged in the opposite direction until said edge is again disposed in said normal position.

5. Centering apparatus for use with a partially unwound roll of sheet material, a shaft coaxially mounting said roll, a frame, and means on said frame supporting said shaft for axial movement, comprising: a guide roller assembly mounted by said frame that includes three aligned guide rollers rotatably mounted by said frame parallel to said shaft whereby said sheet material may be stretched over one edge of the center and one of the outer rollers and from said one edge of the center roller over the opposite edge of the outer roller; holder means affixed to said frame; a mounting arm mounted by said holder means in alignment with and intermediately of said one edge of the center roller and said one of the outer rollers whereby it may undergo transverse movement relative to a side edge of the portion of sheet material disposed between the last-mentioned rollers; spring means biasing said arm toward said side edge of the sheet material; a generally U-shaped engaging element formed on said mounting arm and having a pair of parallel legs that are each formed with aligned notches for receiving said side of the sheet material whereby said arm will be moved transversely relative to said frame concurrently with transverse movement of said side edge relative thereto; a pair of flexible, vertically extending horizontally spaced fingers mounted by said arm; a single flexible, vertically extending finger mounted by said holder means so as to normally be disposed between and spaced from said pair of fingers; electrical contact points mounted by the free ends of said fingers, transverse movement of said arm in one direction effecting the engagement of the contact points of one of said pair of fingers and said single finger and transverse movement of said arm in the opposite direction effecting the engagement of the contact points of the other of said pair of fingers and said single finger; a screw member rotatably mounted by said frame parallel to said shaft; a nut member threadedly engaged with said screw member whereby upon rotation of said screw member said nut member will move transversely relative to said frame; means connecting said nut member to said shaft in order that the transverse movement of said nut member may effect concurrent axial movement of said shaft; an electric motor for driving said screw member, said electric motor being adapted to be reversed by reversing the direction of electric current flow to its field; conduits for connecting the field of said motor to a source of electric current flowing in one direction; branch conduits for connecting the field of said motor to a source of electric current flowing in the opposite direction; an electric solenoid switch having conductor bars for alternately connecting said conduits or said branch conduits to said field when said switch is energized, said switch normally being non-energized whereby said bars will be disengaged from both said conduits and said branch conduits; and, wiring connecting said contact points to said switch whereby upon transverse movement of said edge in one direction away from its normal position said switch will be energized to cause said motor to operate to urge said shaft in the opposite direction until said edge is again disposed in its normal position whereupon said switch will be de-energized, and upon transverse movement of said edge in the opposite direction away from its normal position said switch will be energized to cause said motor to operate in reverse so as to urge said shaft in said one direction until said edge is again disposed in its normal position.

References Cited in the file of this patent

UNITED STATES PATENTS

| | | |
|---|---|---|
| 1,186,906 | Hopkins | June 13, 1916 |
| 1,945,981 | Quinby | Feb. 6, 1934 |
| 1,957,122 | Wood | May 1, 1934 |
| 2,037,086 | Nash | Apr. 14, 1936 |
| 2,201,769 | Graham | May 21, 1940 |
| 2,534,686 | Strauss et al. | Dec. 19, 1950 |
| 2,636,692 | Picking | Apr. 28, 1953 |
| 2,640,660 | Winkler et al. | June 2, 1953 |